J. W. MURRAY.
FIGURE TOY.
APPLICATION FILED SEPT. 13, 1913.
1,110,224.
Patented Sept. 8, 1914.
2 SHEETS—SHEET 1.
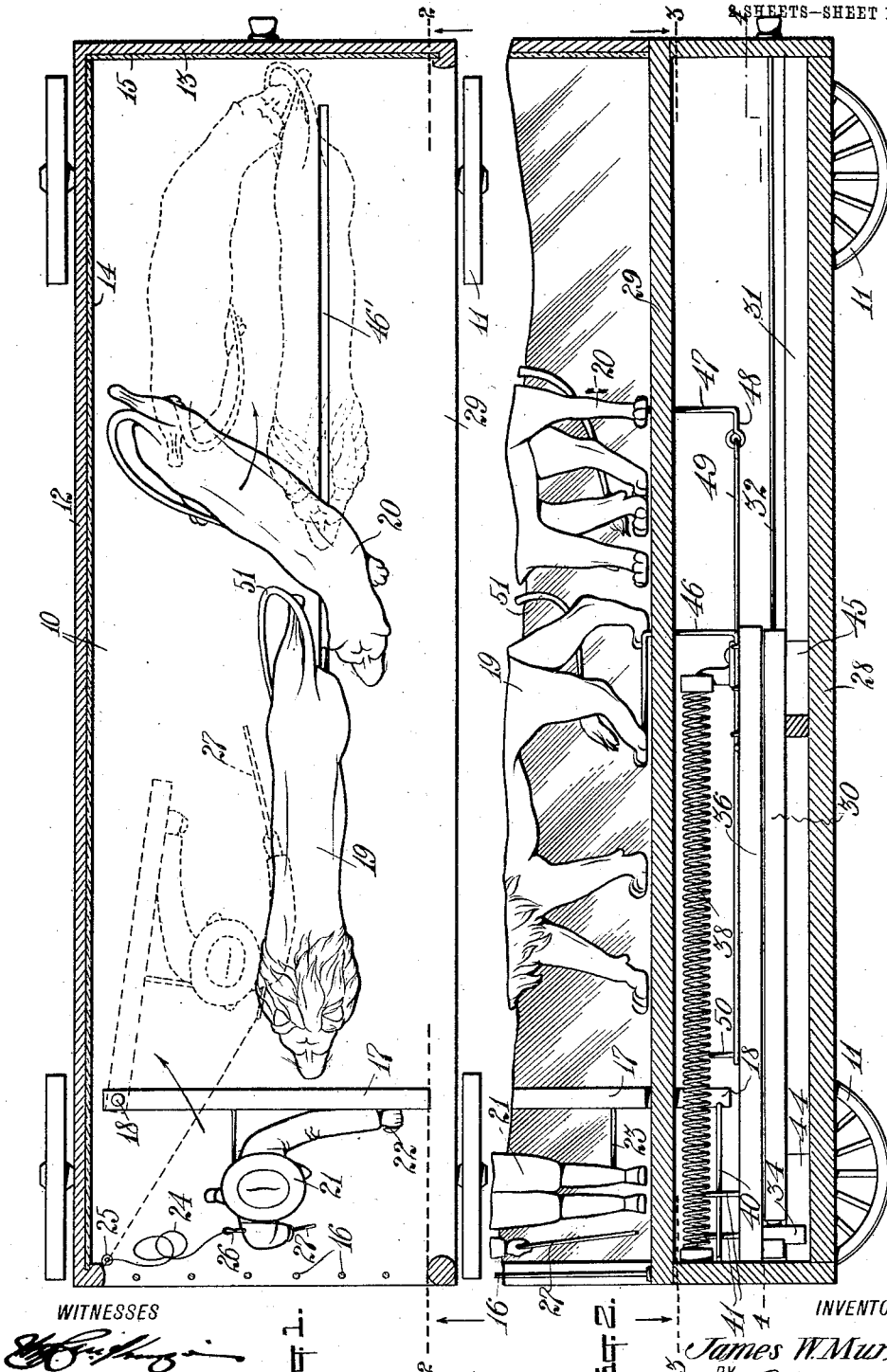
WITNESSES
INVENTOR
James W. Murray
BY
ATTORNEYS J. W. MURRAY.
FIGURE TOY.
APPLICATION FILED SEPT. 13, 1913.
1,110,224.
Patented Sept. 8, 1914.
2 SHEETS—SHEET 2.
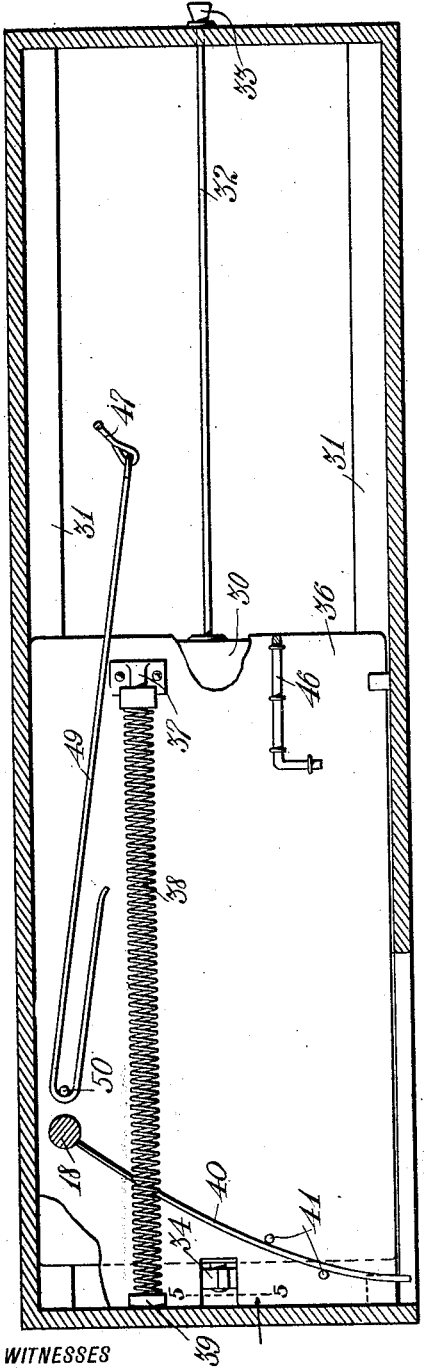
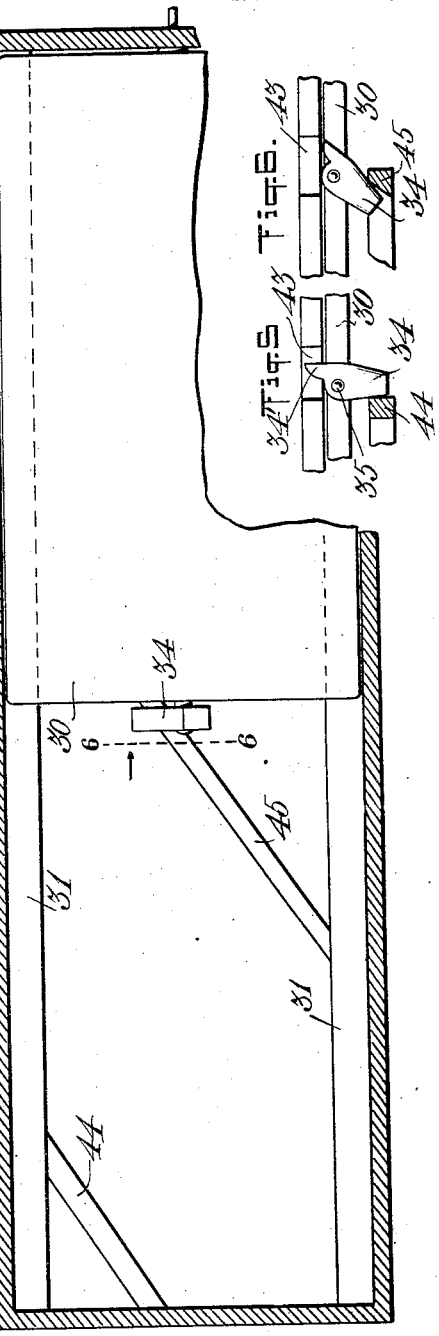
WITNESSES
INVENTOR
James W. Murray
BY
ATTORNEYS

UNITED STATES PATENT OFFICE.

JAMES WELLESLEY MURRAY, OF ST. GEORGE, NEW BRUNSWICK, CANADA.

FIGURE TOY.

1,110,224. Specification of Letters Patent. Patented Sept. 8, 1914.

Application filed September 13, 1913. Serial No. 789,636.

*To all whom it may concern:*

Be it known that I, JAMES W. MURRAY, a subject of the King of Great Britain, and a resident of St. George, in the county of Charlotte and Province of New Brunswick, Dominion of Canada, have invented a new and Improved Figure Toy, of which the following is a full, clear, and exact description.

This invention relates to toys and has particular reference to devices of this character in which certain figures, such as, for instance, figures of ferocious animals are employed.

Among the special objects of the invention is to attract attention and create amusement by the simulation of a cage of wild beasts having a keeper and certain mechanism being employed whereby the animals and the keeper will be given certain movements.

For a fuller understanding of the invention including its mode of construction and manner of operation, reference is to be had to the following detailed description and accompanying drawings forming a part of this specification in which like characters of reference indicate corresponding parts in all the views, and in which—

Figure 1 is a horizontal section of the device taken between the ceiling of the cage and the tops of the figures; Fig. 2 is a fragmentary longitudinal vertical section on the line 2—2 of Fig. 1; Fig. 3 is a horizontal section on the line 3—3 of Fig. 2; Fig. 4 is a similar view on the line 4—4 of Fig. 2 showing the slide in different position; and Figs. 5 and 6 are detailed views of the cage mechanism on the corresponding lines of Figs. 3 and 4, respectively.

The several parts of the device may be made of any suitable materials and the relative sizes and proportions, as well as the design of the figures and the other parts, may be varied to a considerable extent without departing from the spirit of the invention hereinafter more fully set forth and specifically claimed.

By way of illustration I show a cage 10 mounted on wheels 11 and of the same general character as an ordinary menagerie cage adapted for transportation. The cage is shown having its rear wall 12 closed as well as one end 13, and to increase the scenic effect said wall and end are provided with mirrors 14 and 15. The opposite end and front wall are open but for a series of upright bars 16.

The cage proper is arranged to contain representations of wild beasts indicated herein as a pair of lions, male and female. I would have it distinctly understood, however, that the spirit of the invention would not be modified by the employment of any other kind of beasts. Between the lions and the open end of the cage is arranged a door 17 mounted to swing on a vertical axis 18 and on the opposite side thereof from the lions 19 and 20 is a figure representing the keeper 21, who has one hand secured to the door knob 22. The keeper figure is connected to the door by a support 23 so as to move as the door swings. A light flexible connection 24 extends from a fixed point 25 at the corner of the cage to a point 26 at the top of the keeper's shoulder opposite the door. A wand or whip 27 is carried by the hand to which the connection is made and the length of the connection is such that when the door swings into or toward the dotted line position of Fig. 1 the connection 24 will be drawn upon so as to swing the keeper's arm upwardly, bringing the wand into a threatening position. The cord or other connection 24 is adjusted to a certain definite length, and adjacent the keeper's shoulder it is connected to the point 26 which extends normally above the pivot of the keeper's arm. Hence, when the keeper is swung around the pivot 18 and the cord 24 brought under tension, the continued movement of the keeper into the last position will cause the cord to draw rearwardly and downwardly upon the point 26 with the result that the wand 27 will be swung upwardly quickly.

The lower portion of the cage between the bottom 28 and false bottom 29 is for the purpose of housing the operating mechanism for the movable figures. Said mechanism comprises a slide 30 consisting of a rectangular member of substantially the full width of the cage and approximately half as long. This slide is movable from one end of the cage to another upon a pair of tracks 31 along opposite edges of the bottom, a rod 32 being attached to one end of the slide for this purpose. Said rod extends through the rear end of the cage and is provided with a finger piece 33 for its manipulation. At the opposite end of the slide from the rod is pivoted a catch 34, the ends of which extend upwardly and downwardly from the pivot 35.

A carriage 36 of the same general size and form as the slide 30 is arranged above the slide and is adapted to move along the upper surface of the slide under certain conditions. Said carriage has connected to it at 37 a coil spring 38 having its opposite end anchored at 39 to the end of the cage, said spring serving to normally maintain the carriage adjacent the open end of the cage or as indicated in Figs. 2 and 3. The pivot post 18 of the door is journaled in the false bottom 29 and extends down toward but out of contact with the carriage 36. The lower end of the post 18 is secured to a finger 40 which extends horizontally therefrom between a pair of studs 41 extending upwardly from the upper surface of the carriage. Movement of the carriage, therefore, in either direction will cause rotation of the post and swinging of the door. It will be understood, therefore, that the spring 38 will serve to move the carriage quickly toward its normal position. Movement of the carriage in the opposite direction is caused by engagement therewith of the point 34' of the catch 34 which is adapted to extend upwardly into a notch 43 formed in the end of the carriage. The catch 34 is turned positively to cause the point 34' to enter the notch 43 by contact with a stationary cam 44 arranged diagonally across the corner of the bottom 28 at the end of the cage, when the slide 30 is forced to that end of the cage by pushing upon the rod 32. A pull upon the rod, therefore, and the slide after the catch has been so set will cause a similar movement of the carriage 36 rearwardly or way from the normal position. When the slide, however, approaches the rear end of the cage the catch 34 will engage another fixed cam 45 arranged across the middle portion of the bottom, causing the catch to release the carriage, as shown in Fig. 6, when the spring will act as above described.

The lion 19 is supported upon a bracket 46 connected to the rear end of the carriage 36 and extending upwardly through a slot 46' in the false bottom 29. The bracket 46 is connected rigidly to the carriage and hence is carried bodily rearwardly therewith. The connection of the bracket is with the lion's foot and hence the lion moves bodily to and fro in the cage. The lioness 20, however, is supported pivotally upon a bracket 47 having a crank 48 at its lower end to which a rod 49 is connected and extends forwardly into slidable engagement with a pin 50 extending upwardly form the carriage. When the carrige is snapped into normal position by the spring 38 the pin 50 engages the rod 49 and causes the lioness to appear to spring around from the dotted line position of Fig. 1 into the full line position following closely the movements of the lion. The connection between the carriage and the rod 49 being loose with respect to rearward movement of the carriage, the lioness is not moved directly by such movement of the carriage. The lion, however, being positively moved by the carriage rearwardly comes into engagement with the lioness, causing her to be pushed around into the dotted line position. The best effect, I find, is produced by making the lion's tail 51 of spring material and it engages along the side of the lioness, making a resilient slidable contact between the two figures. Said tail 51 also constitutes a cushion or buffer against which the lioness springs during the forward movement of the figures.

From the foregoing description the operation may be briefly summarized as follows: With the parts in the normal positions indicated in Figs. 1 and 2, an outward or rearward pull upon the rod 32 and slide 30 will make a corresponding movement of the carriage 36, forcing the figures into the dotted line position and putting the spring under tension. At the end of this movement of the slide the catch 34 will release the carriage, permitting the spring to return the carriage to normal position and causing the lions to spring toward the keeper. The connection, however, between the studs 41 and the door pivot post will return the keeper to normal position ahead of the lions, and the keeper's arm will drop by gravity. The slide 30 may be returned by pushing inwardly upon the rod 32 at any time, and when forced inwardly as far as possible it will cause engagement of the catch 34, as shown in Fig. 5.

Having thus described my invention, I claim as new and desire to secure by Letters Patent:

1. In a device of the character set forth, the combination of a frame, a plurality of figures movably mounted therein, a door between one of the figures and the others, and means to swing the door open and cause the appearance of said one figure with respect to the others and simultaneously therewith to cause the backward movement of said others.

2. In a device of the character set forth, the combination with a cage having a floor, of a door above the floor, a pivot post for the door journaled in the floor, a figure of a keeper secured to the door on one side thereof, a pair of animal figures on the other side of the door, and means below the floor and acting therethrough to cause the door to swing open to present the keeper to the supposed view of the animals and the simultaneous receding movement of the animals away from the keeper, substantially as set forth.

3. In a device of the character set forth, the combination of a pair of animal figures, one of said figures being mounted for pivotal movement around the axis of one hind foot, means to positively move the other of said figures rearwardly, the latter mentioned figure being provided with a spring tail adapted to engage against the first mentioned figure to cause the same to swing around its axis, and other means to cause both of the animals to spring quickly forwardly to normal position.

4. In a device of the character set forth, the combination of a cage, a false bottom for the cage, a plurality of movable figures above the false bottom, and mechanism for moving the figures, said mechanism being located below the false bottom and acting therethrough, said mechanism including a reciprocating carriage acting directly upon said mechanism, a slide in proximity to the carriage, a catch serving to connect the carriage temporarily to the slide, and means to automatically connect and disconnect said catch.

In testimony whereof I have signed my name to this specification in the presence of two subscribing witnesses.

JAMES WELLESLEY MURRAY.

Witnesses:
 FRANK G. HIBBARD,
 CHARLES JOHNSON.

Copies of this patent may be obtained for five cents each, by addressing the "Commissioner of Patents, Washington, D. C."